Jan. 17, 1967     B. BARENYI     3,298,734
VEHICLE TOP STRUCTURE
Original Filed March 19, 1963
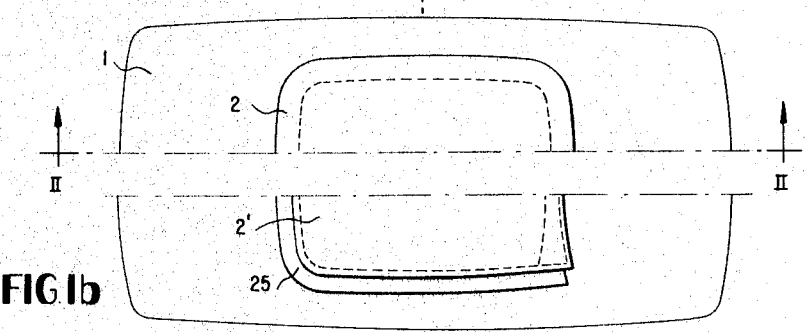
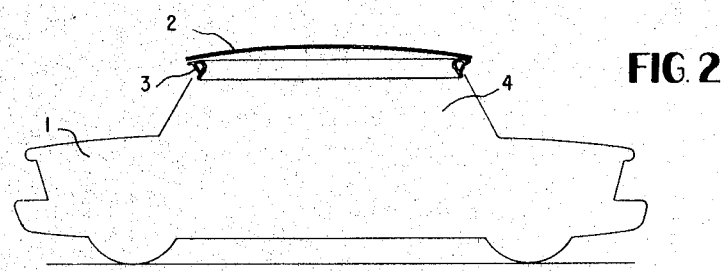
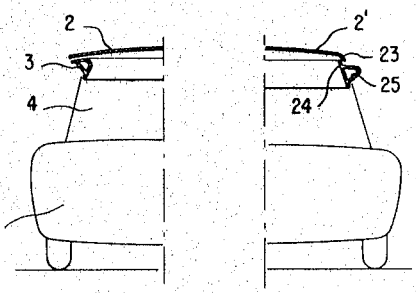
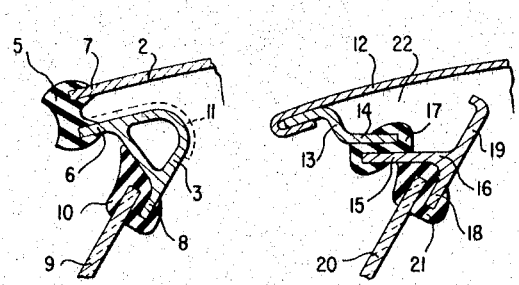
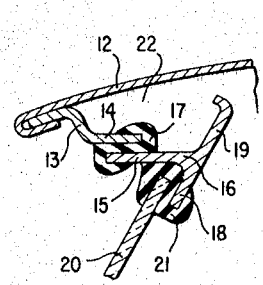
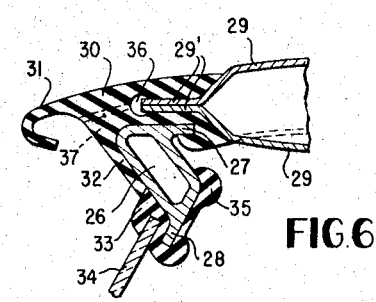
INVENTOR.
BELA BARENYI
BY Dicke & Craig
ATTORNEYS

United States Patent Office 3,298,734
Patented Jan. 17, 1967

3,298,734
VEHICLE TOP STRUCTURE
Bela Barenyi, 22 Weglanderstrasse,
7 Stuttgart-Vaihingen, Germany
Original application Mar. 19, 1963, Ser. No. 266,305, now Patent No. 3,233,937, dated Feb. 8, 1966. Divided and this application Oct. 22, 1965, Ser. No. 508,186
Claims priority, application Germany, Mar. 23, 1962, D 38,451
32 Claims. (Cl. 296—137)

This application is a division of application Serial No. 266,305, filed March 19, 1963, now Patent No. 3,233,937.

The present invention relates to a vehicle body top part, especially for passenger motor vehicles, provided with a roof which is secured at an annularly shaped endless roof frame, and which has the purpose of simplfying the securing of the roof at the roof frame and to so constitute the same that the roof is readily detachable.

The present invention essentially consists in connecting the roof with the roof frame exclusively by an elastic profiled ledge member extending about the roof and made of rubber or plastic material. For that purpose, the roof frame may be provided with a flange extending approximately parallelly to the roof rim whereby the flange as well as the roof rim engage into one groove each of the profiled ledge member. It is thereby appropriate if the connecting flange at the roof frame and/or the corresponding rim of the roof is outwardly inclined in the downward direction.

A further advantageous construction of the present invention results if the flange or roof rim overlap. The flange and the roof rim may thereby be directed mutually oppositely.

According to a further feature of the present invention, the roof rim may be provided additionally with a downwardly directed flange and/or with an upwardly directed flange. This would be the case, for example, with an L-shaped or with a T-shaped cross section or profile. The roof rim according to the present invention may, however, also have a hook-shaped or S-shaped cross section. In many cases, it is appropriate if the roof frame is provided with a hollow profile or cross section having an approximately A-shaped or approximately S-shaped cross section.

The downwardly directed flange of the roof frame may form the upper part of a window frame into which is inserted the window with the aid of a window molding. In that case, it is appropriate if the profiled ledge member retaining the roof extends with a lip portion thereof to the window molding. Both the sealing of the roof as well as of the window is improved thereby. Additionally, it is of advantage for reasons of safety if the window molding and/or the profiled ledge member at least partially cover or overlap with a lip portion thereof the inner side of the roof frame.

According to still a further feature of the present invention, the roof and the profiled ledge member may be so constructed that the surface of the profiled ledge member continues or extends the roof surface in the outward direction and preferably is provided with a downwardly bent outer rim. Particularly with such an arrangement, the profiled ledge member may be provided advantageously with a water channel at the bottom of the groove receiving therein the rim portion of the roof from which branch off spaced water outlet or discharge apertures extending through the profiled ledge member to the outside thereof.

The roof itself may be constituted by a flat or arched plate preferably consisting of plastic material. Additionally, the roof may also be provided for purposes of reinforcement with a rim that is rolled or bent over, welded thereto or bonded thereto, for example, by glueing or cementing. Of particular advantage is a roof that is composed of two half-shells constructed preferably of mirror image-like construction which are connected with each other along the rim thereof. Such half-shells may consist preferably of light metal foils or plastic material, and the hollow space formed by the half-shells may be foamed with a foaming plastic material. Such a roof is of very light weight, nonetheless has very good heat- and sound-insulating properties. Furthermore, the roof may also protrude outwardly beyond the profiled ledge member and may cover the same from above so that the profiled ledge member is effectively protected against moisture.

Accordingly, it is an object of the present invention to provide a top construction for vehicles, especially motor vehicles which produces a readily detachable roof by simple and relatively inexpensive means.

It is another object of the present invention to provide a top structure for a vehicle body in which the roof is secured to an annularly-shaped roof frame exclusively by elastic means detachably connecting the roof to the roof frame while at the same time assuring a good seal of the space formed within the top.

Still another object of the present invention resides in the provision of a vehicle top in which the means detachably securing the roof to the roof frame are greatly simplified.

Still a further object of the present invention resides in the provision of a vehicle top, especially for passenger motor vehicles having a detachably secured roof in which the sealing of the roof as well as of the windows is greatly improved and the safety of the passengers normally accommodated therewithin is enhanced.

These and other objects, features and advantages of the present invention will become more obvious from the following description when taken in connection with the accompanying drawing which shows, for purposes of illustration only, several embodiments in accordance with the present invention and wherein:

FIGURES 1a and 1b are schematic partial plan views of a passenger motor vehicle provided with two different roof constructions in accordance with the present invention, FIGURE 2 is a schematic longitudinal cross sectional view through the passenger motor vehicle of FIGURE 1a taken along line II—II of FIGURE 1a.

FIGURES 3a and 3b are partial schematic transverse cross sectional views through the passenger motor vehicles according to FIGURES 1a and 1b, respectively, taken along line III—III, FIGURE 4 is a partial cross sectional view, on an enlarged scale, through the roof rim of the passenger motor vehicle according to FIGURES 1a, 2 and 3a, and FIGURES 5 and 6 are partial cross sectional views, similar to FIGURE 4, through two further modified embodiments of roof rims of motor vehicles in accordance with the present invention.

Referring now to the drawing wherein like reference numerals are used throughout the various views to designate corresponding parts, and more particularly to FIGURES 1a, 2 and 3a, the passenger motor vehicle 1 schematically illustrated therein is provided with a roof 2 consisting of an arched plate which is connected with the ring- or annularly-shaped, fully closed or endless roof frame 3 of the motor vehicle top part 4 by a surrounding elastic profiled ledge member 5 extending about the top 4. As illustrated in greater detail in FIGURE 4, the roof frame 3 consists of a hollow profiled sectional member having an approximately A-shaped cross section. One leg portion of the A-shaped cross section constitutes a flange 6 which extends approximately parallelly to the rim portion 7 of the roof 2, both the flange 6 and the rim portion 7 being slightly inclined outwardly in the downward direction. The roof rim portion 7 overlaps the similarly directed flange 6 so that both terminate approximately in a common plane disposed perpendicularly to the surfaces thereof. The flange 6 and the roof rim 7 engage both in a respective groove which is accommodated for that purpose in the profiled ledge member 5. Consequently, the roof 2 is safely and securely retained at the roof frame 3 by the elastic stress of the profiled ledge member 5 which may consist of rubber or plastic material, yet is nevertheless readily detachable therefrom in case of need. The roof 2 may consist of a sheet metal plate or also of a plastic material plate.

The downwardly directed leg portion 8 of the roof frame 3 simultaneously forms the upper part of a window frame into which the window pane 9 is inserted with the aid of a window molding 10. The lip portion of the profiled ledge member 5 abutting against the inner side of the A-shaped roof bearer member 3 may advantageously be so extended that it covers or overlaps at least partly the inner side of the roof frame 3. Such an extended lip portion 11 is indicated in dash line in FIGURE 4 and designated therein by reference numeral 11. Such a lip portion has the purpose to lessen any impact of the passengers against the roof frame 3 in case of accident and thereby to increase the safety of the passengers.

With the roof arrangement according to FIGURE 5, the roof 12 is provided with a roof reinforcement 13 inserted into the rolled or bent-over portion which reinforcement 13 forms an inwardly directed roof rim 14. This roof rim 14 overlaps the oppositely and outwardly directed flange 15 of the roof bearer 16. The profiled ledge member 17 is again provided with two grooves into which engage the roof rim 14 and the flange 15 both of which extend approximately horizontally. The roof 12 protrudes outwardly beyond the profiled ledge member 17 and thereby protects the same against dampness and moisture whereby the sealing of the roof is improved.

The roof bearer 16 is additionally provided with a downwardly directed flange 18 and with an upwardly directed flange 19. The downwardly directed flange 18 serves again for securing the window pane 20 with the aid of a window molding 21 whereas the upwardly directed flange 19 defines a channel-shaped hollow space 22 which may be used as air channel, for accommodating lines or cables, or also for storing small objects.

The roof arrangement in the passenger motor vehicle according to FIGURES 1b and 3b is similar to the embodiment according to FIGURE 5 to the extent that the downwardly bent rim portion 23 of the roof 2' also overlaps thereat the flange 24 of the roof bearer 25 constructed again as hollow profile or sectional member and is oppositely directed with respect thereto. For purposes of connecting the roof 2' with the roof bearer 25, a profiled ledge member is also used in this embodiment which is similar to the profiled ledge member 17 according to FIGURE 5.

In the embodiment of FIGURE 6 the roof bearer 26 has an approximately S-shaped profile with a horizontally inwardly directed flange 27 and an inclined downwardly directed flange 28. The roof consists in this embodiment of two mirror-image like similar half shells 29 which are connected with each other along the edges or rims 29' thereof. The half shells 29 of the roof may, for example, consist of plastic material but may also consist of very thin lightweight metal foils. The necessary rigidity is attained by foaming the hollow body formed by the half shells with a foaming plastic material. Such a roof is very light and notwithstanding very rigid in form and has excellent properties with respect to sound and heat insulation. The roof rim 29' and the flange 27 are again directed mutually oppositely, overlap each other and engage in corresponding grooves in the profiled ledge member 30. The profiled ledge member 30 has such a form that it extends and continues the roof surface in the outward direction. The outer rim 31 thereof is bent downwardly and inwardly. Furthermore, the profiled ledge member 30 is provided with a lip portion 32 which covers the outer surface of the roof bearer 26 and extends to the window pane molding 33 which retains the window pane 34 adjoining the flange 28. Both the sealing effect of the profiled ledge member 30 as well as of the window molding 33 is improved by the lip portion 32. The window molding 33 is provided with an extension 35 which covers substantially the inner surface of the roof bearer 26 in order to increase the safety of the passengers. The profiled ledge member 30 is additionally provided with a water duct or channel 36 at the bottom of the groove receiving the roof rim 29' from which water discharge apertures 37 branch off at given distances which extend to the outside of the profiled ledge member 30 and enable a drainage of the water that may penetrate or seep into the gap between the roof and the profiled ledge member 30.

While I have shown and described several embodiments in accordance with the present invention, it is understood that the same is not limited thereto but is susceptible of numerous changes and modifications within the spirit and scope thereof. For example, in lieu of the illustrated roofs, roof bearers and profiled ledge member, numerous other shapes of roofs, roof bearers and profiled ledge members are possible which permit a safe securing of the roof along the annular roof bearer without departing from the spirit of the present invention.

Thus, it is obvious that the present invention is not limited to the details shown and described herein but is susceptile of numerous changes and modifications as known to a person skilled in the art and I, therefore, do not wish to be limited to the details shown and described herein but intend to cover all such changes and modifications as are encompassed by the scope of the appended claims.

I claim:
1. A vehicle body top, especially for passenger motor vehicles, comprising:
   roof means having a roof rim,
   annularly shaped roof frame means including connecting flange means,
   and means including elastic profiled ledge means extending about said top connecting said roof means around the entire periphery thereof with said roof frame means exclusively by said elastic profiled ledge means, said roof frame means being completely resiliently mounted on the vehicle,
   said connecting flange means and the corresponding roof rim overlapping at least partly,
   said connecting flange means and the corresponding roof rim extending in substantially mutually opposite directions.

2. A vehicle body top, especially for passenger motor vehicles, comprising:
   roof means having a roof rim,
   annularly shaped roof frame means,
   and means including elastic profiled ledge means extending about said top connecting said roof means around the entire periphery thereof with said roof frame means exclusively by said elastic profiled ledge means,
   said roof frame means being provided with connecting flange means extending approximately parallelly to the roof rim of said roof means, and said flange means as well as said roof rim engaging into a respective groove provided within said profiled ledge means, said roof frame means being entirely resiliently mounted on the vehicle,
   said connecting flange means and the corresponding roof rim overlapping at least partly,
   said connecting flange means and the corresponding roof rim extending in substantially mutually opposite directions.

3. In a vehicle body top, especially for passenger motor vehicles, having a roof with a rim secured to a ring-shaped roof frame, the improvement essentially consisting of means connecting said roof around the entire periphery thereof to said roof frame exclusively by an elastic profiled ledge member extending about the top, the roof frame being provided with a flange approximately parallel to the roof rim, and said flange as well as the roof rim engaging in a respective groove each provided in said profiled ledge member, said roof frame having an approximately hook-shaped cross section.

4. In a vehicle body top, especially for passenger motor vehicles, having a roof with a rim secured to a ring-shaped roof frame, the improvement essentially consisting of means connecting said roof around the entire periphery thereof to said roof frame exclusively by an elastic profiled ledge member extending about the top, the roof frame being provided with a flange approximately parallel to the roof rim, and said flange as well as the roof rim engaging in a respective groove each provided in said profiled ledge member, said roof frame having an approximately S-shaped cross section.

5. In a vehicle body top, especially for passenger motor vehicles, having a roof with a rim secured to a ring-shaped roof frame, the improvement essentially consisting of means connecting said roof around the entire periphery thereof to said roof frame exclusively by an elastic profiled ledge member extending about the top, the roof frame being provided with a flange approximately parallel to the roof rim, and said flange as well as the roof rim engaging in a respective groove each provided in said profiled ledge member, said roof frame including a hollow profile member of approximately S-shaped cross section.

6. A vehicle body top, especially for passenger motor vehicles, comprising:

roof means having a rim, annularly shaped roof frame means, and means including elastic profiled ledge means connecting said roof means around the entire periphery thereof with said roof frame means exclusively by said elastic profiled ledge means, said roof frame means being provided with flange means extending approximately parallelly to the roof rim of said roof means, and said flange means as well as said roof rim each engaging into a respective groove provided within said profiled ledge means, the surface of said profiled ledge means continuing the roof surface in the outward direction and being provided with a downwardly bent outer rim.

7. A vehicle body top, especially for passenger motor vehicles, comprising:

roof means having a rim, annularly shaped roof frame means, and means including elastic profiled ledge means connecting said roof means around the entire periphery thereof with said roof frame means exclusively by said elastic profiled ledge means, said roof frame means being provided with flange means extending approximately parallelly to the roof rim of said roof means, and said flange means as well as said roof rim each engaging into a respective groove provided within said profiled ledge means, and said profiled ledge means being provided at the bottom of the groove receiving said roof means with a water channel, and spaced discharge openings extending from said water channel through said profiled ledge means to the outside thereof.

8. In a vehicle body top, especially for passenger motor vehicles, having a roof secured to a ring-shaped substantially closed roof frame, the improvement essentially consisting of means connecting said roof around the entire periphery thereof to said roof frame exclusively by an elastic profiled ledge member extending about the top, the roof frame being provided with a flange approximately parallel to the roof rim, and said flange as well as the roof rim engaging in a respective groove each provided in said profiled ledge member, and the roof being constituted by a plate member, and reinforcing rim means at said roof plate member for reinforcing said roof.

9. In a vehicle body top, especially for passenger motor vehicles, having a roof secured to a ring-shaped roof frame, the improvement essentially consisting of means connecting said roof around the entire periphery thereof to said roof frame exclusively by an elastic profiled ledge member extending about the top, and said roof being composed of two half-shells having rim portions and being connected with each other along the rim portions thereof.

10. In a vehicle body top, especially for passenger motor vehicles, having a roof secured to a ring-shaped roof frame, the improvement essentially consisting of means connecting said roof around the entire periphery thereof to said roof frame exclusively by an elastic profiled ledge member extending about the top, and said roof being composed of two half-shells having rim portions and being connected with each other along the rim portions thereof, said half-shells being made of a material selected from the group consisting of plastic material and light metal foils, and the hollow space formed therebetween being filled with a foaming plastic.

11. In a vehicle body top, especially for passenger motor vehicles, having a roof secured to a ring-shaped roof frame entirely resiliently mounted on the vehicle, the improvement essentially consisting of means connecting said roof around the entire periphery thereof to said roof frame exclusively by an elastic profiled ledge member extending about the top, and the roof protruding outwardly beyond the elastic profiled ledge member and covering the same from above.

12. A vehicle body top according to claim 8, wherein said roof frame is entirely resiliently mounted on the vehicle.

13. A vehicle body top, especially for passenger motor vehicles, comprising: roof means having a roof rim, annularly shaped roof frame means, and means including elastic profiled ledge means extending about said top connecting said roof means around the entire periphery thereof with said roof frame means exclusively by said elastic profiled ledge means, said roof frame means being provided with connecting flange means extending approximately parallelly to the roof rim of said roof means, and said flange means as well as said roof rim engaging into a respective groove provided within said profiled ledge means, said roof frame means being resiliently mounted to the vehicle, at least one of the two parts consisting of said connecting flange means and of the corresponding roof rim of said roof means being outwardly and downwardly inclined, said connecting flange means and the corresponding roof rim extending in substantially mutually opposite directions.

14. The vehicle body top according to claim 13, wherein said roof means is constituted by a plate member, reinforcing rim means extending reversely inwardly from said roof plate member for reinforcing said roof means, and said profiled ledge means having a substantially S cross-sectional shape.

15. The vehicle body top according to claim 13, wherein said roof frame means simultaneously forms the upper part of a window frame into which is inserted a window with the aid of window molding means, said profiled ledge means having a lip portion extending near said window molding means, said roof frame means having a downwardly extending flange overlapping and substantially parallel to the window, and said molding means being substantially S-shaped in cross-section.

16. The vehicle body top according to claim 13, wherein said roof frame means has an upwardly and inwardly extending flange forming in part an annular upwardly extending channel means for housing cables and storing small objects.

17. The vehicle body top according to claim 13, wherein said roof means is constituted by a plate member, reinforcing rim means extending reversely inwardly from said roof plate member for reinforcing said roof means, and said profiled ledge means having a substantially S cross-sectional shape, said reinforcing rim and connecting flange means extending substantially horizontally and overlapping each other.

18. The vehicle body top according to claim 17, wherein said roof frame means simultaneously forms the upper part of a window frame into which is inserted a window with the aid of window molding means, said profiled ledge means having a lip portion extending near said window molding means, said roof frame means having a downwardly extending flange overlapping and substantially parallel to the window, and said molding means being substantially S-shaped in cross-section, and said roof frame means has an upwardly and inwardly extending flange forming in part an annular upwardly extending channel means for housing cables and storing small objects.

19. The vehicle body top according to claim 1, wherein said roof frame means simultaneously forms the upper part of a window frame into which is inserted a window with the aid of resilient window molding means, said profiled ledge means having a lip portion extending near said window molding means, said roof frame means having a downwardly depending flange substantially parallel to and overlapping the upper portion of the window, and said molding means having a substantially S-shape in cross-section.

20. The vehicle body top according to claim 1, wherein said roof frame means has an upwardly and inwardly extending flange forming in part an annular upwardly extending channel means for housing cables and storing small objects.

21. The vehicle body top according to claim 1, wherein said profiled ledge means includes an outwardly projecting outer rim extending beyond said roof means around the entire periphery thereof.

22. The vehicle body top according to claim 1, wherein said roof means is composed of two substantially mirror-image half shells having rim portions and being connected with each other along said rim portions around the entire periphery thereof.

23. The vehicle body top according to claim 22, wherein said half shells form a hollow space therebetween, and a foamed plastic material entirely filling the hollow space between said half shells, and said half shells being made of a material selected from the group consisting of plastic material and light metal foil.

24. The vehicle body top according to claim 23, wherein the profiled ledge means has an upper surface substantially flush with and immediately adjacent to the upper surface of the upper one of said half shells that defines the hollow space.

25. The vehicle body top according to claim 1, wherein said roof frame means simultaneously forms the upper part of a window frame into which is inserted a window with the aid of resilient window molding means, said profiled ledge means having a lip portion extending near said window molding means, said roof frame means having a downwardly extending depending flange extending substantially parallel and overlapping the upper portion of the window.

26. The vehicle body top according to claim 25, wherein said molding means is substantially S-shaped with the lower leg extended to cover the inwardly and downwardly facing portion of said roof frame means to constitute elastic cushion means for preventing injury to passengers and the like when striking said roof frame means.

27. The device of claim 26, wherein the upper edge of said molding means and the lower edge of said profiled ledge means are aligned and abutting to form a continuous resilient outside surface.

28. The vehicle top according to claim 27, wherein said profiled ledge means includes an outwardly projecting outer rim extending beyond said roof means around the entire periphery thereof, said roof means is composed of two substantially mirror-image half shells having rim portions and being connected with each other along said rim portions around the entire periphery thereof, said half shells form a hollow space therebetween, and a foamed plastic material entirely filling the hollow space between said half shells, and said half shells being made of a material selected from the group consisting of plastic material and light metal foil.

29. The vehicle top according to claim 2, wherein said roof frame means is substantially uniform around the entire periphery thereof and constitutes in cross-sectional a tubular portion having a substantially horizontally inwardly extending flange and a downwardly extending flange.

30. A vehicle body top, especially for passenger motor vehicles, comprising: roof means, annularly shaped roof frame means, and means including elastic profiled ledge means, connecting said roof means around the entire periphery thereof with said roof frame means exclusively by said elastic profiled ledge means, said roof frame means simultaneously forming the upper part of a window frame into which is inserted a window with the aid of resilient window molding means, and said profiled ledge means having a lip portion extending at least near said window molding means, said roof frame means having a connecting flange extending into a correspondingly shaped groove in said profile ledge means, said roof means having a rim portion extending into a correspondingly shaped groove in said profiled ledge means, said connecting flange and said roof rim portion extending in substantially mutually opposite directions.

31. The vehicle body top of claim 30, wherein said window molding means at least partly covers with a lip portion thereof the interior side of said frame means, and extending around the entire periphery of said frame means.

32. The vehicle top of claim 30, wherein said profiled ledge means and said window molding means are in abutting relationship on the outside of said roof frame means.

References Cited by the Examiner

UNITED STATES PATENTS

| | | | |
|---|---|---|---|
| 2,240,933 | 5/1941 | Komenda | 296—29 |
| 3,015,519 | 1/1962 | Barenyi | 296—137 |
| 3,118,701 | 1/1964 | Peras | 296—137 X |

MILTON BUCHLER, *Primary Examiner.*

BENJAMIN HERSH, *Examiner.*

C. C. PARSONS, *Assistant Examiner.*